United States Patent
Mosher et al.

(10) Patent No.: US 10,863,306 B2
(45) Date of Patent: Dec. 8, 2020

(54) AUTO-CONFIGURING RADIO BEACONS

(71) Applicant: NCR Corporation, Duluth, GA (US)

(72) Inventors: Benjamin A Mosher, Cumming, GA (US); William Ellis Stansfield, Decatur, GA (US); Andrew Smith, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 620 days.

(21) Appl. No.: 14/500,070

(22) Filed: Sep. 29, 2014

(65) Prior Publication Data

US 2016/0094952 A1    Mar. 31, 2016

(51) Int. Cl.
  *G06Q 20/20* (2012.01)
  *H04W 4/02* (2018.01)
  *G06Q 20/32* (2012.01)
  *H04W 4/029* (2018.01)
  *G06F 8/654* (2018.01)

(52) U.S. Cl.
  CPC ............ *H04W 4/023* (2013.01); *G06F 8/654* (2018.02); *G06Q 20/20* (2013.01); *G06Q 20/202* (2013.01); *G06Q 20/327* (2013.01); *H04W 4/029* (2018.02)

(58) Field of Classification Search
  CPC .............................. G06Q 20/20; G06Q 20/202
  USPC ...................................................... 705/16, 21
  See application file for complete search history.

(56) References Cited

U.S. PATENT DOCUMENTS

| | | | | |
|---|---|---|---|---|
| 9,596,702 B2* | 3/2017 | Smith | ............... | H04W 74/0816 |
| 2002/0137462 A1* | 9/2002 | Rankin | ............... | G08G 1/0962 |
| | | | | 455/41.2 |
| 2007/0123249 A1* | 5/2007 | Sun | ............... | G01S 19/14 |
| | | | | 455/423 |
| 2008/0172491 A1* | 7/2008 | Chhabra | ............... | H04L 5/0091 |
| | | | | 709/227 |
| 2012/0250537 A1* | 10/2012 | Shatil | ............... | H04W 52/0216 |
| | | | | 370/252 |
| 2012/0309394 A1* | 12/2012 | Radulescu | ........ | H04W 36/0055 |
| | | | | 455/436 |
| 2015/0348146 A1* | 12/2015 | Shanmugam | ...... | G06Q 30/0603 |
| | | | | 705/71 |
| 2015/0382150 A1* | 12/2015 | Ansermet | .......... | G06Q 10/0639 |
| | | | | 455/41.1 |
| 2016/0019522 A1* | 1/2016 | Granbery | ............. | G06Q 20/227 |
| | | | | 705/21 |

* cited by examiner

*Primary Examiner* — Florian M Zeender
*Assistant Examiner* — Christopher R Buchanan
(74) *Attorney, Agent, or Firm* — Schwegman, Lundberg & Woessner

(57) ABSTRACT

Various embodiments each include at least one of systems, methods, devices, and software for auto-configuring of radio beacon devices. One embodiment includes a method that detects a beacon device has been connected to a computing device and retrieving beacon identifying data from the beacon device. The method may then query a backend system based on the beacon identifying data to determine whether the beacon identifying data has been previously configured in the backend system. When the beacon device has been previously configured in the backend system, the method includes issuing a command to the backend system to remove the previous configuration of the beacon device then issuing a data write command to the backend system to configure the beacon device in the backend system in association with the computing device.

9 Claims, 4 Drawing Sheets

AUTO-CONFIGURING RADIO BEACONS

BACKGROUND INFORMATION

Radio beacons, such as BLUETOOTH® beacon devices, are gaining popularity in many settings. Such beacon devices are used to enable mobile devices to obtain data from which a current location can be determined relative to either one or more known locations or an actual location with a certain degree of accuracy. Beacon devices may be deployed such that their positioning capabilities may be leveraged for several purposes. However, beacon device configuration to date has been manual. Administrators are required to manually create and update data in backend systems that associates particular beacon devices to specific locations or in association with other specific devices. As with any manual process, this is prone to error. Errors are quite common when a location record for a particular beacon device already exists and the beacon device is relocated without an update to the location data or new location data is created without removing the previous location data. This results in data integrity issues that can cause system failures and unpredictable system performance.

SUMMARY

Various embodiments each include at least one of systems, methods, devices, and software for auto-configuring of radio beacons, such a BLUETOOTH® beacon devices.

One embodiment includes a method. This method includes detecting a beacon device has been connected to a computing device and retrieving beacon identifying data from the beacon device. The method may then query a backend system based on the beacon identifying data to determine whether the beacon identifying data has been previously configured in the backend system. When the beacon device has been previously configured in the backend system, the method includes issuing a command to the backend system to remove the previous configuration of the beacon device then issuing a data write command to the backend system to configure the beacon device in the backend system in association with the computing device.

Another method embodiment includes receiving, via a network interface device of a backend system, a query for a beacon identifier in a mapping of beacon device identifiers to terminal identifiers. When the beacon identifier is present in the mapping of beacon device identifiers to terminal identifiers, the method deactivates the mapping of the beacon device identifier to the terminal identifier. The method may further receive and process a data write command to write a mapping of the beacon identifier to a second terminal identifier. The mapping of the beacon identifier to the second terminal identifier enables the backend system to associate a terminal of the second terminal identifier to actions initiated on mobile devices received with the beacon identifier.

A further embodiment is in the form of a system. The system of such embodiments may be a terminal, such as a point of sale terminal, an automated teller machine, a kiosk, and the like. The system of such embodiments includes at least one processor, at least one memory device, a device connector to connect to ancillary devices, and at least one network interface device. The system also includes an instruction set, stored in memory and executable by the at least one processor to perform data processing activities. These data processing activities include detecting a beacon device has been connected to the device connector, such as a USB port, and retrieving beacon identifying data from the beacon device. The data processing activities further include generating and issuing, via the at least one network interface device to a backend system, a data write command to configure the beacon device in the backend system in association with the system.

DETAILED DESCRIPTION

Figure 1:
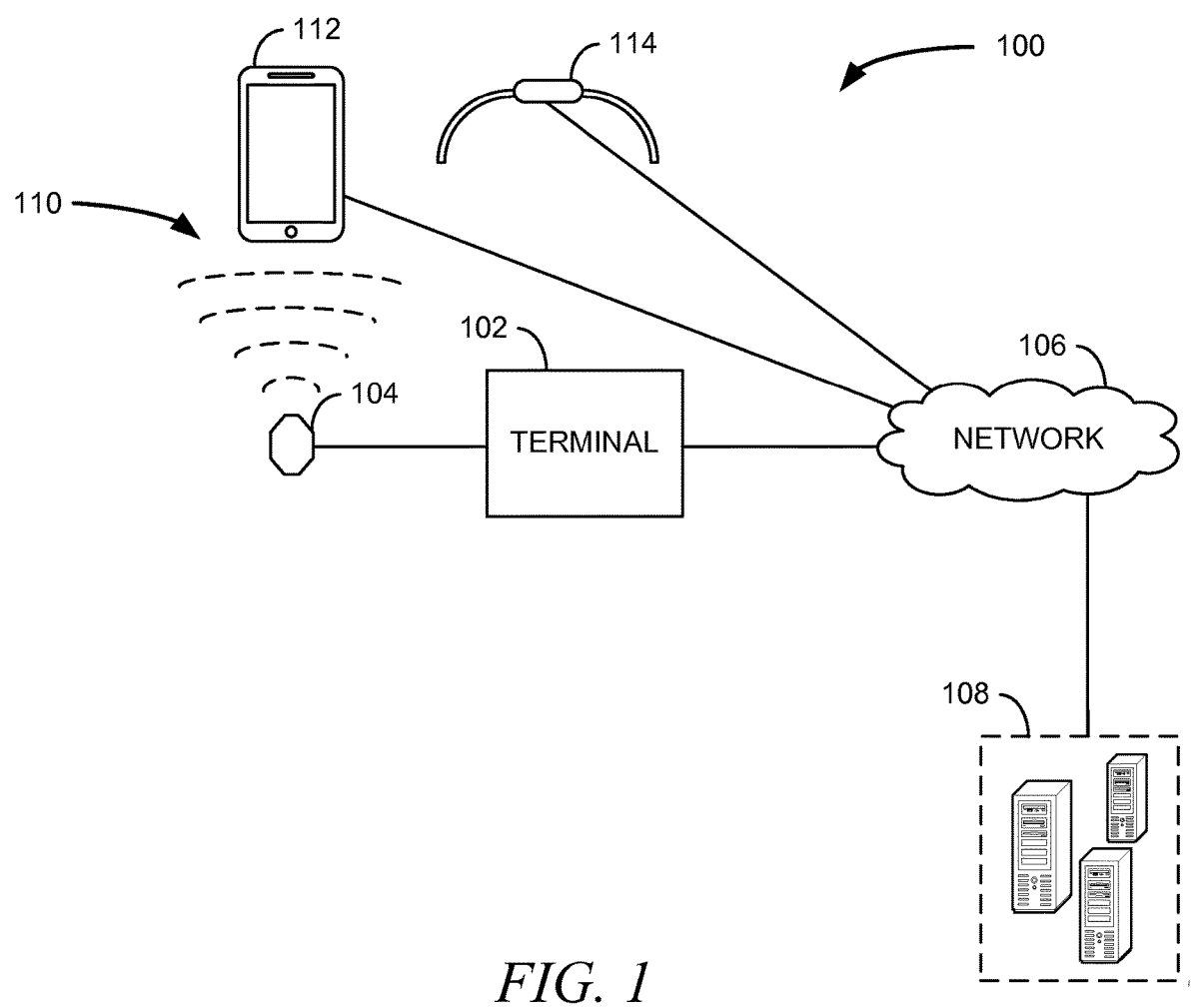
FIG. 1 is a logical block diagram of a system, according to an example embodiment.

Various embodiments each include at least one of systems, methods, devices, and software for auto-configuring of radio beacons, such a BLUETOOTH® beacon devices. Such beacon devices are deployed to enable mobile devices to obtain data from which a current location can be determined relative to either one or more known locations or an actual location with a certain degree of accuracy. Beacon devices may be deployed such that their positioning capabilities may be leveraged for several purposes, such as enabling a mobile payment process initiated on a mobile device when the mobile device is within a certain proximity of a specific point of sale (POS) terminal. The mobile device in such embodiments, knowing it is within the certain proximity of the POS terminal may initiate a mobile payment process over a network with a backend system to cause a payment to be made and the POS terminal to be notified of that payment. The payment amount may be received by the mobile device from the POS terminal either directly via a close-range radio signal, such as BLUETOOTH®, or by presenting a scannable code that can be scanned utilizing a camera of the mobile device. The payment amount alternatively may be communicated via the backend system or a mobile device user may input into a mobile device app an amount to be paid. Regardless, the mobile device initiates the payment or communication of other data to the POS terminal or other terminal based on beacon device identifying data received by the mobile device from one or more beacon devices.

As the beacon devices enable the mobile device and backend system in such embodiments to identify the terminal, such as the POS terminal, to which data, such as payment data, is to be communicated, configuring beacon devices and the backend system with regard to the beacon devices and the terminals is performed. As mentioned above, beacon device configuration to date has been manual. Administrators are required to manually create and update data in backend systems that associates particular beacon devices to specific locations or in association with other specific devices. As with any manual process, this is prone to error. Errors are quite common when a location or terminal association record for a particular beacon device already exists and the beacon device is relocated without an update to the location data or terminal to which it is coupled or new location data is created without removing the previous location data. This results in data integrity issues that can cause system failures and unpredictable system performance.

Various embodiments herein provide for auto-configuring of the beacon devices when they are coupled to a terminal, such as a POS terminal, which may be a self-service terminal (SST) (e.g., self-service POS terminal, an automated teller machine (ATM), information kiosk, etc.). In some such embodiments, a beacon device may be coupled to a terminal a wired or wireless connection such as a Universal Serial Bus (USB), a BLUETOOTH® or WI-FI®, or other wired or wireless connection. When the beacon device is coupled to the terminal, a beacon device configuration process that executes on the terminal obtains configuration data from the beacon device. The configuration data may include a beacon device identifier that is broadcast by the beacon device when activated, a representation of software or firmware that controls beacon operation such as a firmware version identifier, and the like. The beacon device configuration process may then update the configuration of the beacon device if needed and register the beacon device with at least one backend system. The registration of the beacon device with the backend system may include removing or deactivating a previous configuration of the beacon device in the backend system and associating the beacon device with the terminal to which the beacon device is coupled. This beacon configuration process, in some embodiments, is automatic requiring no, or at least minimal, human interaction. As a result, beacon device configuration is simplified, enhanced, and data integrity issues are resolved.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 is an example embodiment of a system that auto-configures beacon devices, such as beacon device 104.

The system 100 includes a terminal 102, such as a POS terminal, SST, ATM, kiosk, or other terminal device. The terminal 102 generally includes a computer that controls operation of the terminal 102. The terminal 102 receives input and provides output to users that may include clerks and customers. The terminal 102 also communicates over one or more networks 106 with other devices and systems, such as one or more backend systems 108, payment processing networks and systems, mobile devices 112, 114, and the like.

As illustrated, a beacon device 104 is coupled to the terminal 102. The beacon device 104 may be coupled to the terminal 102 by a wired or wireless connection, such as USB, BLUETOOTH®, WI-FI®, and the like. The beacon device 104, in some embodiments, may include a radio transceiver device, such as a BLUETOOTH® beacon device. Among others, such beacon devices are available from NCR Corporation of Duluth, Ga. The positioning beacon device may also, or alternatively, include a WI-FI® Wireless Access Point (WAP) device in some embodiments. The radio signal, or signals, broadcast by the beacon device 104 are received by a mobile device 112, 113 of an individual desiring to interact with the terminal 102. Some embodiments may include a plurality of positioning beacon devices, each broadcasting unique data, such as beacon device 104 identifiers.

As mentioned above, the system 100 includes mobile devices 112, 114 connected to the network 106. The mobile devices 112, 114 may include one or more of smartphones 112, smartwatches 114, handheld computers, and the like. Further, although only two mobile devices 112, 114 are illustrated, in typical embodiments there are many mobile devices 112, 114. The mobile devices 112, 114 are carried or worn by individuals that interact with the system 100. The mobile devices 112, 114 include a mobile device app deployed thereon that provides one or more functionalities relevant to the particular embodiment of the system 100, such as mobile payment, mobile banking, and other functionality.

The backend system 108 is a system within which beacon devices 104 are configured in association with terminals 102. A mobile device 112, 114 app, upon receipt of a broadcast beacon device 104 identifier may request data over the network 106 from the backend system 108 with regard to the beacon device 104 identifier. The data may then be retrieved by the backend system 108, such as from a database or other data storage mechanism or data structure, and be provided to the requesting mobile device 112, 114. The data with regard to the beacon device 104, in some embodiments may simply identify a terminal 102 to which the beacon device 104 is associated. The data may also include beacon device 104 configuration data, such as a signal strength required before a data processing action, such as a mobile payment, may be initiated on the mobile device 112, 114, can be initiated. Such a signal strength, in such embodiments, may be set globally with regard to all beacon devices 104, with regard to all beacon devices 104 deployed at a particular location such as a store or bank, or with regard to the specific beacon device 104. Once factor in a signal strength of a signal received by a mobile device 112, 114 is distance of the mobile device 112, 114 from the beacon device 104. Thus, the signal strength configuration setting may be set to help ensure mobile devices 112, 114 are within an acceptable distance and are in fact the proper mobile device 112, 114 desiring to interact with a process that involves the terminal 102.

In one embodiment of the system 100, mobile device 112 is carried by an individual visiting a restaurant. The mobile device 112 includes an app deployed thereon that is specific to the restaurant or chain of the restaurant. The individual has an account of the restaurant or chain and the account includes an associated payment account established within the app, such as may be associated with a credit card of the individual. The individual orders food at the restaurant and given an amount payable. Rather than paying directly at a POS terminal at the restaurant, the individual instead utilizes the mobile device 112 app. The terminal is coupled to the beacon device 104 and a transceiver device of the mobile device 112 receives a signal broadcast by the beacon device 104. Data of the signal is provided by the mobile device 112 to the app and the app utilizes data encoded in the signal to obtain data over the network 106 from the backend system 108 with regard to the beacon device 104. This data identifies the terminal 102. The mobile device 112 app then provides an option for the individual to initiate payment to the identified terminal 102. The mobile device 112 app then transmits a payment command to the backend system 108 via the network 106. A payment process that executes at least in part on the backend system 108 then processes the payment command and upon success, sends a message to at least the terminal 102 indicating the payment has been received. The backend system may also transmit a message to the mobile device 112 app indicating payment has been received and may also transmit receipt data.

Returning now to the beacon device 104, when the beacon device 104 is coupled to the terminal 102, the beacon device 104 is configured within the system 100. This configuration may include configuring the beacon device 104 itself and configuring the backend system 108 to be aware of the terminal 102 with which the beacon device 104 cooperatively operates. In some embodiments, when a process that executes on the terminal 102 detects that beacon device 104 has been coupled thereto, the process operates to configure, or at least confirm the configuration of, one or both of the beacon device 104 and the backend system 108 with regard to the beacon device 104.

In some embodiments, the process that executes on the terminal 102 retrieves configuration data from the beacon device 104. The configuration data may include a beacon device identifier that is broadcast by the beacon device 104 when activated, a representation of software or firmware that controls beacon device 104 operation such as a firmware version identifier, and the like. The process may then update the configuration of the beacon device 104 if needed and register the beacon device 104 with the backend system 108. The registration of the beacon device 104 with the backend system 108 may include removing or deactivating a previous configuration of the beacon device 104 in the backend system 108 and associating the beacon device 104 with the terminal 102 to which the beacon device 104 is coupled. This terminal 102 process, in some embodiments, is automatic requiring no, or at least minimal, human interaction. As a result, beacon device 104 configuration is simplified, enhanced, and data integrity issues are resolved.

Figure 2:
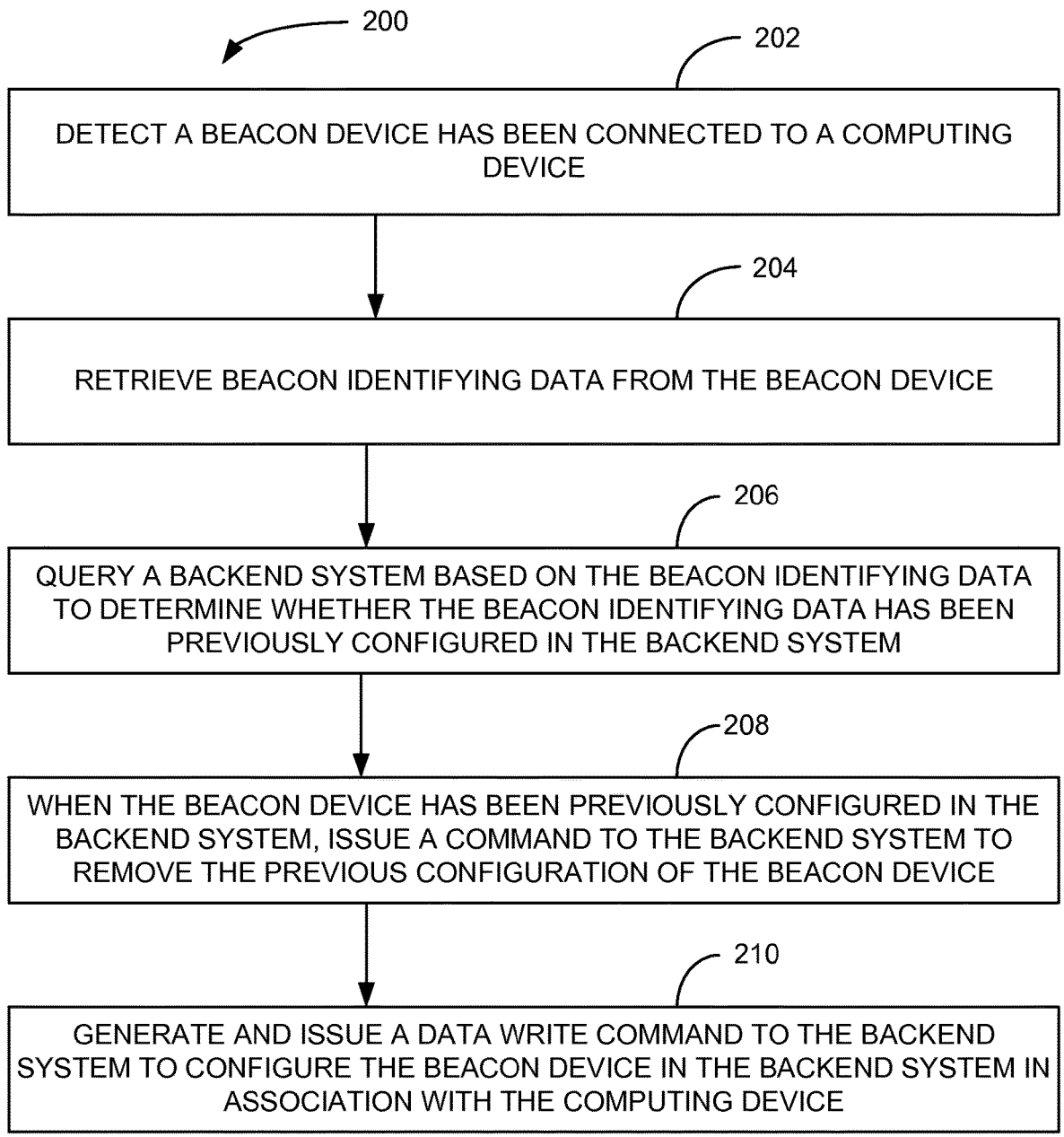
FIG. 2 is a block flow diagram of a method, according to an example embodiment.

FIG. 2 is a block flow diagram of a method 200, according to an example embodiment. The method 200 is an example of a method that may be performed by a terminal, such as terminal 102 illustrated and described with regard to FIG. 1, to configure a beacon device, such as beacon device 104 also of FIG. 1, when the beacon device is coupled to the terminal.

The method 200 includes detecting 202 a beacon device has been connected to a computing device, such as a computing device that controls operation of a terminal as described above. The detecting 202 that the beacon device has been coupled to the terminal may be made automatically upon the computing device detecting the device has been physically coupled to the computing device, such as by a USB connection, upon receipt of a user input indicating the beacon device has been coupled, or as may be otherwise determined in various embodiment.

The method 200 continues by retrieving 204 beacon identifying data from the beacon device and querying 206 the backend system based on the beacon identifying data to determine whether the beacon identifying data has been previously configured in the backend system. In some embodiments, when the beacon device has been previously configured, a determination is made as to whether that configuration is the same as it should be when coupled to the computing device. If it is the same, no further action need be taken. However, when the beacon device has been previously configured in the backend system but with a different computing device, the method includes issuing 208 a command to the backend system to remove, which may include deactivating, the previous configuration of the beacon device. The method 200 then generates and issues 210 a data write command, such as an update or insert command to a database management system or a web service call, to the backend system to configure the beacon device in the backend system in association with the computing device.

Some embodiments of the method 200 further verify a configuration of the beacon device itself. This may include querying the beacon device to obtain version data of firmware, software and other firmware and software configuration data that may be present on the beacon device. The method 200 in such embodiments then determines whether the version data of the firmware, software, and other firmware and software configuration data present on the beacon device is current. This may include comparing data from the beacon device to data present on the computing device performing the method 200, retrieving data from the backend system or other network location to compare against the beacon device data, or transmitting data via the network to a remote process of the backend system or other system to receive a reply indicating whether the beacon device configuration is current. When the firmware is not the current, the method retrieves relevant firmware and software update data, either from a local data storage device of the computing device performing the method or from a network location, and writes the update data to the beacon device.

In some embodiments, once the method 200 completes the configuration of one or both of the beacon device and the backend system, a confirmation may be received from the backend system indicating the configuration success. In some embodiments, the beacon device may then be decoupled form the computing device performing the method 200. In some such embodiment, the method 200 may cause an output of an instruction via a user interface presented on a display of the computing device indicating the beacon device may be uncoupled from therefrom. In such embodiments, the beacon device may be powered by a battery or coupled to another power source. Thus, in some embodiments, the beacon device need not be coupled directly to, either wired or wirelessly, for the computing device, beacon device, and backend system to properly function.

Figure 3:
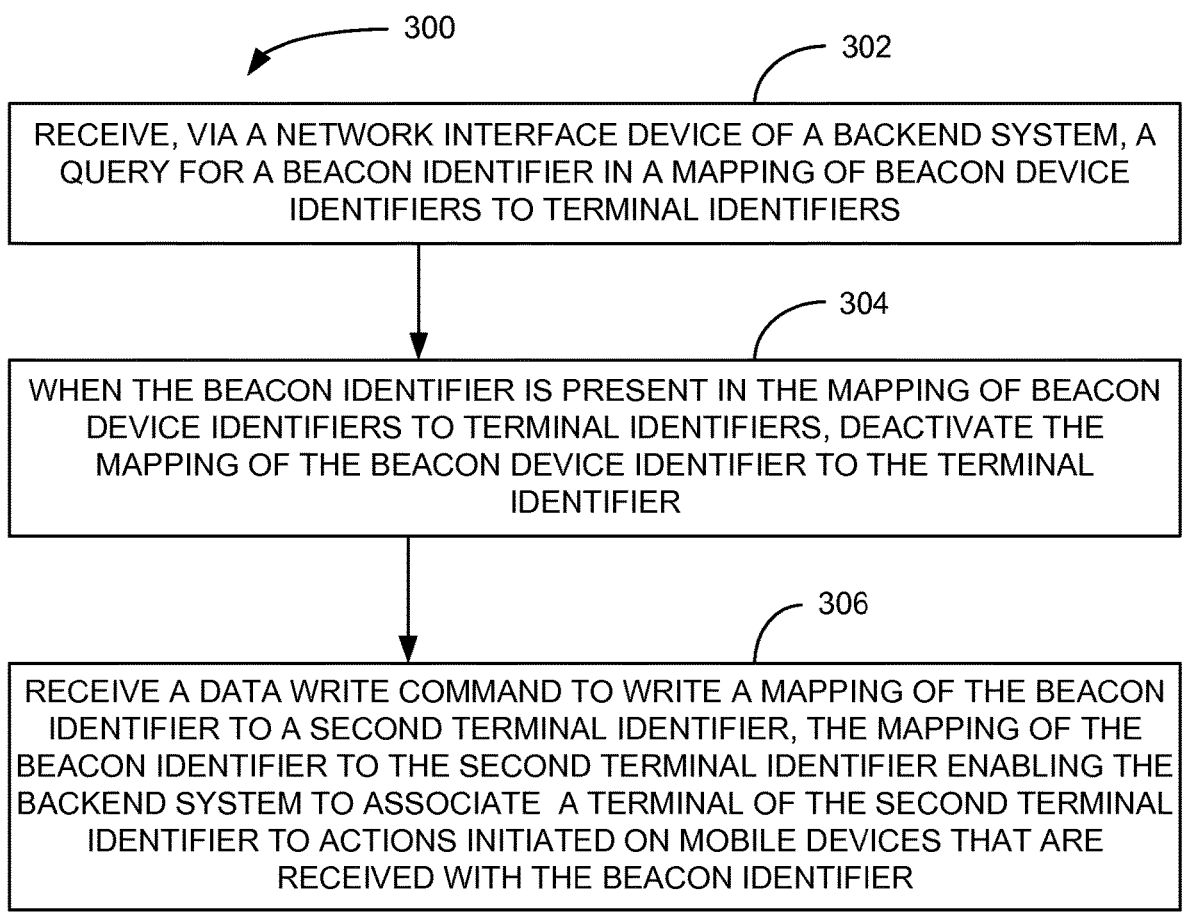
FIG. 3 is a block flow diagram of a method, according to an example embodiment.

FIG. 3 is a block flow diagram of a method 300, according to an example embodiment. The method 300 is an example of a method that may be performed by a backend system, such as backend system 108 illustrated and described with regard to FIG. 1, to configure the backend system with regard to a beacon device, such as beacon device 104, also of FIG. 1.

The method 300 includes receiving 302, via a network interface device of a backend system, a query for a beacon identifier in a mapping of beacon device identifiers to terminal identifiers. The query in some embodiments is received via a network to which the network interface device of the backend system is coupled from a terminal, such as terminal 102 of FIG. 1. In some such embodiments, when the beacon identifier is present in the mapping of beacon device identifiers to terminal identifiers, the method 200 includes deactivating 304 the mapping of the beacon device identifier to the terminal identifier. The deactivating 304 may include writing data to the mapping indicating the mapping is no longer active. In other embodiments, the deactivating 304 may include deleting data of the mapping. The method 300 further includes receiving 306 and processing a data write command to write a mapping of the beacon identifier to a second terminal identifier. This mapping of the beacon identifier to the second terminal identifier enables the backend system to associate a terminal of the second terminal identifier to actions initiated on mobile devices that are received with the beacon identifier. In some embodiments of the method 300, received 302 query, deactivating 304, and received 306 data write command are received as a single command by the backend system from a terminal.

Figure 4:
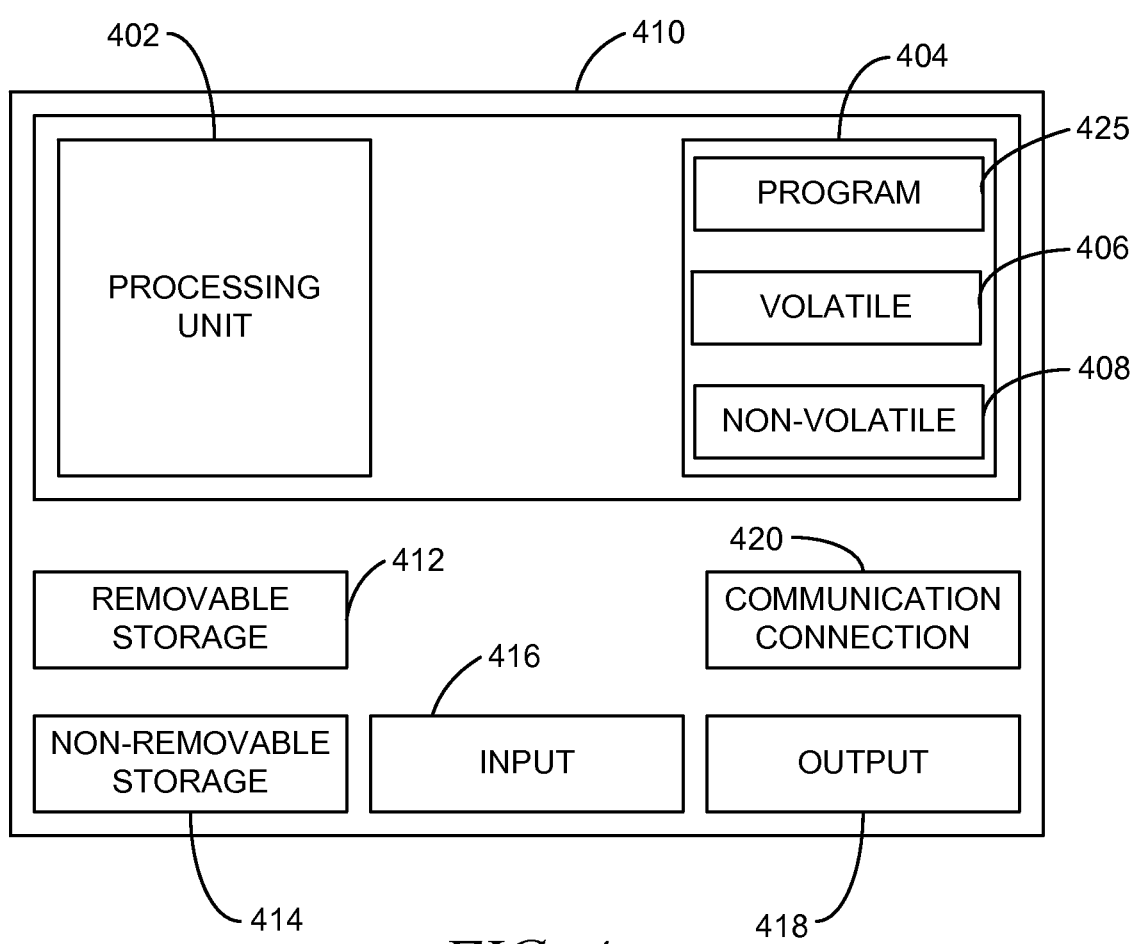
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, smartwatch, or other computing device including the same or similar elements as illustrated and described with regard to FIG. 4. Devices such as smartphones, tablets, and smartwatches are generally collectively referred to as mobile devices. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 410 may include or have access to a computing environment that includes input 416, output 418, and a communication connection 420. The input 416 may include one or more of a touchscreen, touchpad, mouse, keyboard, camera, one or more device-specific buttons, one or more sensors integrated within or coupled via wired or wireless data connections to the computer 410, and other input devices. The computer 410 may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 420 may also or alternatively include a transceiver device, such as a BLUETOOTH® device that enables the computer 410 to wirelessly receive data from and transmit data to other BLUETOOTH® devices.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

Another embodiment is in the form of a system. The system of such embodiments may be a terminal, such as the terminal 102 illustrated and described with regard to FIG. 1. The system of such embodiments includes at least one processor, at least one memory device, a device connector to connect to ancillary devices, and at least one network interface device. The system also includes an instruction set, stored in memory and executable by the at least one processor to perform data processing activities. These data processing activities include detecting a beacon device has been connected to the device connector, such as a USB port, and retrieving beacon identifying data from the beacon device. The data processing activities further include generating and issuing, via the at least one network interface device to a backend system, a data write command to configure the beacon device in the backend system in association with the system.

In some of these system embodiments the data processing activities further include querying, via the at least one network interface device, the backend system based on the beacon identifying data and system identifying data to determine whether the beacon identifying data and system identifying data has been previously configured in the backend system. When either of the beacon device and the system have been previously configured in the backend system, the data processing activities include issuing a command to the backend system to remove the previous configuration, such as by deleting the previous configurations or marking them as inactive.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   detecting, by a computing device, a beacon device has been physically connected to the computing device;
   upon detection of the physical connection to the beacon device, automatically:
      retrieving, by the computing device, beacon identifying data from the beacon device;
      querying, by the computing device, a backend system based on the beacon identifying data to determine whether the beacon identifying data has been previously configured in the backend system;
      when the beacon device has been previously configured in the backend system, issuing, by the computing device, a command to the backend system to remove the previous configuration of the beacon device; and
      generating and issuing, by the computing device, a data write command to the backend system to configure the beacon device in the backend system in association with the computing device and according to a beacon device configuration setting specific to the computing device; and
   wherein:
      the beacon device is to remain physically connected to the computing device;
      the computing device is a point of sale (POS) terminal; and
      the beacon device configuration setting specific to the computing device is specific to the POS terminal and includes a strength of signal setting, related to a distance from the beacon device to a mobile device, the strength of signal setting defining a minimal signal strength to allow an action to be triggered from the mobile device when receiving a radio signal broadcast by the beacon device, the action to be triggered from the mobile device is a payment action that can be triggered from a mobile device to cause a payment to be made from an account associated with a mobile device user account that is processed at least in part by the backend system, upon success of which causes a payment confirmation message to be sent to the POS terminal.

2. The method of claim 1, further comprising:
   querying the beacon device to obtain version data of firmware and other firmware configuration data present on the beacon device;
   determining whether the version data of the firmware and other firmware configuration data present on the beacon device is current; and
   when the firmware is not the current, retrieving firmware update data and writing the firmware update data to the beacon device.

3. The method of claim 1, wherein the beacon device is a radio transceiver device that broadcasts identifying data.

4. The method of claim 1, wherein generating and issuing the data write command to the backend system to configure the beacon device in the backend system in association with the computing device relies upon a standard configuration for beacon devices configured in the backend system.

5. The method of claim 1, wherein generating and issuing the data write command to the backend system to configure the beacon device in the backend system in association with the computing device includes invoking a web service offered by the backend system.

6. The method of claim 1, further comprising:
   receiving a confirmation from the backend system that the data write con mand was successful; and
   outputting an instruction via a user interface of the computing device indicating the beacon device may be uncoupled from the computing device.

7. A system comprising:
   at least one processor, at least one memory device, a device connector to connect to ancillary devices, and at least one network interface device;
   an instruction set, stored in memory and executable by the at least one processor to perform data processing activities, the data processing activities comprising:
      detecting a beacon device has been connected to the device connector;
      upon detection of the physical connection to the beacon device, automatically:
         retrieving beacon identifying data from the beacon device;
         querying, via the at least one network interface device, the backend system based on the beacon identifying data and system identifying data to determine whether the beacon identifying data and system identifying data has been previously configured in the backend system;
         when either of the beacon device and the system has been previously configured in the backend system, issuing a command to the backend system to remove the previous configuration;
         generating and issuing, via the at least one network interface device to a backend system, a data write command to configure the beacon device in the backend system in association with the system and according to a beacon device configuration setting specific to the computing device; and
      wherein;
         the beacon device is to remain physically connected to the computing device;
         the system is a point of sale (POS) terminal;
         generating and issuing the data write command to the backend system to configure the beacon device in the backend system in association with the system includes generating the data write command according to a beacon device configuration setting specific to the POS terminal and includes a strength of signal setting, related to a distance from the beacon device to a mobile device, the strength of signal setting defining a minimal signal strength to allow an action to be triggered from the mobile device when receiving a radio signal broadcast by the beacon device, the action to be triggered from the mobile device is a payment action that can be triggered from a mobile device to cause a payment to be made from an account associated with a mobile device user account that is processed at least in part by the backend system, upon success of which causes a payment confirmation message to be sent to the POS terminal.

8. The system of claim 7, wherein the data processing activities further comprise:
   query the beacon device to obtain version data of firmware present on the beacon device;

determining whether the version data of the firmware present on the beacon device is a current firmware version; and when the firmware version is not the current firmware version, retrieving firmware update data and writing the firmware update data to the beacon device.

9. The system of claim 7, wherein the beacon device is a radio transceiver device that broadcasts beacon identifying data.

* * * * *